(12) United States Patent
Shuto et al.

(10) Patent No.: US 9,733,541 B2
(45) Date of Patent: Aug. 15, 2017

(54) ELECTROPHORESIS DEVICE, DISPLAY UNIT, AND ELECTRONIC APPARATUS

(71) Applicant: Sony Corporation, Tokyo (JP)

(72) Inventors: Aya Shuto, Kanagawa (JP); Hidehiko Takanashi, Kanagawa (JP); Ken Kobayashi, Kanagawa (JP); Yuriko Kaino, Kanagawa (JP); Masakazu Mitsugi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/424,252

(22) PCT Filed: Jul. 17, 2013

(86) PCT No.: PCT/JP2013/069360
§ 371 (c)(1),
(2) Date: Feb. 26, 2015

(87) PCT Pub. No.: WO2014/038291
PCT Pub. Date: Mar. 13, 2014

(65) Prior Publication Data
US 2015/0227017 A1    Aug. 13, 2015

(30) Foreign Application Priority Data
Sep. 5, 2012 (JP) ................. 2012-195236

(51) Int. Cl.
*G02B 26/00* (2006.01)
*G02F 1/03* (2006.01)
(Continued)

(52) U.S. Cl.
CPC ........ *G02F 1/167* (2013.01); *G02F 1/133348* (2013.01); *G02F 2001/1678* (2013.01)

(58) Field of Classification Search
CPC . G02F 1/167; G02F 1/03; G02F 1/133; G02F 1/061; G02F 2001/1678; G02B 26/00; G02B 26/08; G02B 26/26
(Continued)

(56) References Cited

U.S. PATENT DOCUMENTS 5,276,438 A * 1/1994 DiSanto ................ G02F 1/167
340/296
5,900,277 A * 5/1999 Fox ..................... C04B 41/5155
164/97
(Continued)

FOREIGN PATENT DOCUMENTS

JP    2003-186064       7/2003
JP    2007279434 A  * 10/2007
(Continued)

OTHER PUBLICATIONS

International Search Report issued in connection with International Patent Application No. PCT/JP2013/069360, dated Oct. 15, 2013. (2 pages).

*Primary Examiner* — Dawayne A Pinkney
(74) *Attorney, Agent, or Firm* — Chip Law Group

(57) ABSTRACT

An electrophoresis device including: in an insulating liquid, migrating particles in a charged state; and a porous layer including a fibrous structure and non-migrating particles, the fibrous structure having a potential opposite to that of the migrating particles, and the non-migrating particles held by the fibrous structure.

15 Claims, 9 Drawing Sheets

(51) Int. Cl.
*G02F 1/133* (2006.01)
*G09G 3/34* (2006.01)
*G03G 17/04* (2006.01)
*G02F 1/167* (2006.01)
*G02F 1/1333* (2006.01)

(58) Field of Classification Search
USPC ............... 359/296, 253–254, 245, 290–291; 349/33; 345/49, 105, 107; 430/31–32
See application file for complete search history.

(56) References Cited

U.S. PATENT DOCUMENTS

| | | | |
|---|---|---|---|
| 2001/0041339 A1* | 11/2001 | Anderson | B01J 19/0046 435/6.11 |
| 2003/0141190 A1* | 7/2003 | Alpenfels | G01N 27/44704 204/606 |
| 2007/0196401 A1* | 8/2007 | Naruse | A61K 8/027 424/401 |
| 2011/0310465 A1 | 12/2011 | Takanashi et al. | |
| 2012/0099182 A1* | 4/2012 | Ogawa | G02F 1/167 359/296 |
| 2015/0044464 A1* | 2/2015 | Joo | D04H 1/728 428/375 |

FOREIGN PATENT DOCUMENTS

| | | |
|---|---|---|
| JP | 2008-197243 | 8/2008 |
| JP | 2009-025551 | 2/2009 |
| JP | 2012-022296 | 2/2012 |
| JP | 2013109221 A * | 6/2013 |

\* cited by examiner

ELECTROPHORESIS DEVICE, DISPLAY UNIT, AND ELECTRONIC APPARATUS

CROSS REFERENCES TO RELATED APPLICATIONS

The present application is a national stage of International Application No. PCT/JP2013/069360 filed on Jul. 17, 2013 and claims priority to Japanese Patent Application No. 2012-195236 filed on Sep. 5, 2012, the disclosure of which is incorporated herein by reference.

BACKGROUND

The present technology relates to an electrophoresis device including migrating particles in an insulating liquid, a display unit using the electrophoresis device, and an electronic apparatus including the display unit.

In recent years, demand for display units (displays) with low power consumption and high image quality have been growing with the widespread use of mobile devices such as cellular phones or personal digital assistants. In particular, the recent launch of electronic book distribution service causes demand for displays with display quality suitable for reading use.

As such displays, there have been proposed various kinds of displays including cholesteric liquid crystal displays, electrophoretic displays, electrical oxidation-reduction displays, and twisting ball displays; however, reflective displays are advantageous for reading use. As with paper, in the reflective displays, display in a bright state is performed with use of reflection (scattering) of outside light; therefore, display quality closer to that of paper is allowed to be obtained.

In the reflective displays, electrophoretic displays using an electrophoretic phenomenon have low power consumption and high response speed; therefore, the electrophoretic displays are considered as potential candidates. As displaying methods by the electrophoretic displays, the following two methods have been mainly proposed.

As a first method, two kinds of charged particles are dispersed in an insulating liquid to be moved by an electric field. These two kinds of charged particles have different optical reflection properties from each other, and are opposite in polarity to each other. In this method, an image is displayed by changing a distribution state of the charged particles according to an electric field.

As a second method, while charged particles are dispersed in an insulating liquid, a porous layer is provided (for example, refer to PTL 1). In this method, the charged particles move through pores of the porous layer according to an electric field. For example, a polymer film may be used as the porous layer.

CITATION LIST

Patent Literature

PTL 1: Japanese Unexamined Patent Application Publication No. 2012-22296

SUMMARY

In the electrophoretic displays, the above-described displaying methods have been proposed; however, the display quality of the electrophoretic displays is still insufficient, and further improvement in contrast and response speed is desired.

Therefore, it is desirable to provide an electrophoresis device, a display unit, and an electronic apparatus that are capable of achieving high contrast and high-speed response.

An electrophoresis device of an embodiment of the present technology includes: in an insulating liquid, migrating particles in a charged state; and a porous layer including a fibrous structure and non-migrating particles, the fibrous structure having a potential opposite to that of the migrating particles, and the non-migrating particles held by the fibrous structure.

A display unit of an embodiment of the present technology includes the above-described electrophoresis device of the embodiment of the present technology.

An electronic apparatus of an embodiment of the present technology includes the above-described display unit of the embodiment of the present technology.

In the electrophoresis device of the embodiment of the present technology, the fibrous structure and the migrating particles have potentials different from each other, i.e., one of them has a positive potential and the other has a negative potential; therefore, migrating particles easily pass in the porous layer.

According to the electrophoresis device, the display unit, and the electronic apparatus of the embodiments of the present technology, the fibrous structure and the migrating particles have potentials opposite to each other; therefore, contrast and response speed are allowed to be improved.

BRIEF DESCRIPTION OF THE FIGURES

FIG. 4 is a sectional view illustrating a configuration of a display unit using the electrophoresis device in FIG. 1 and the like.

DETAILED DESCRIPTION

Figure 1:
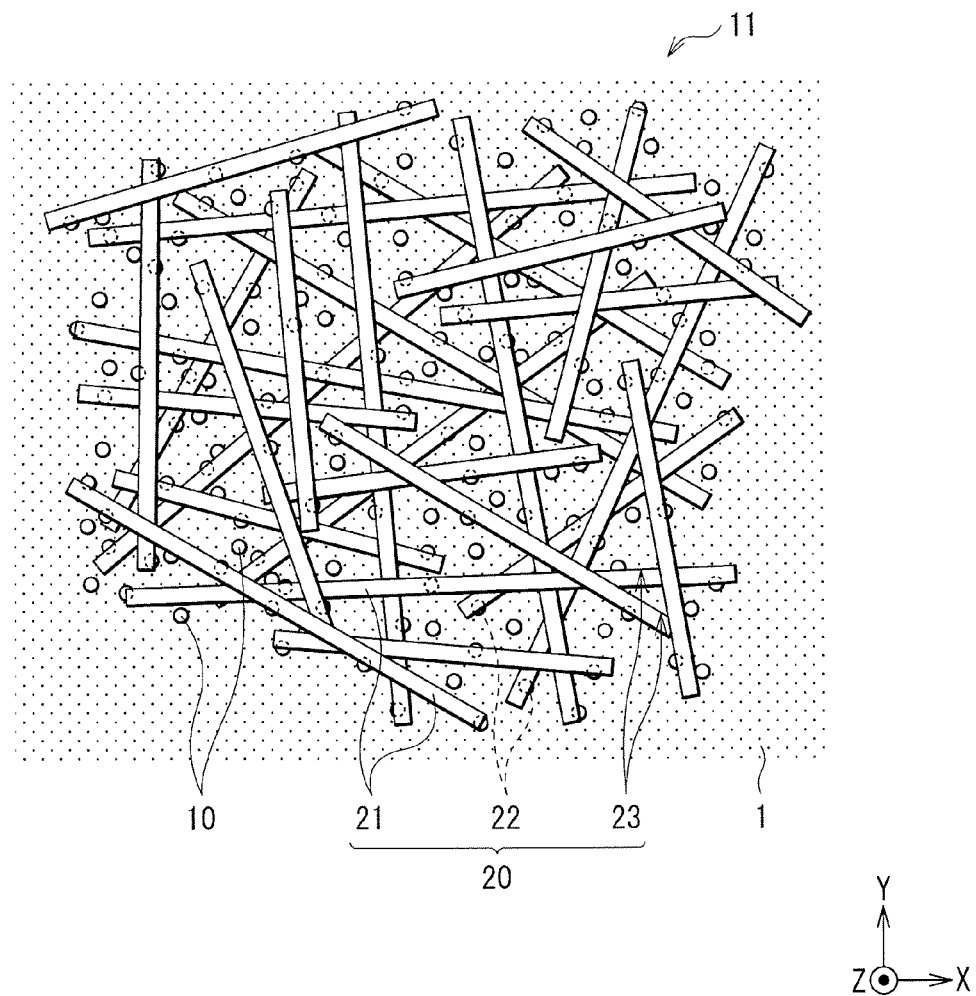
FIG. 1 is a plan view illustrating a configuration of an electrophoresis device according to an embodiment of the present technology.
Figure 2:
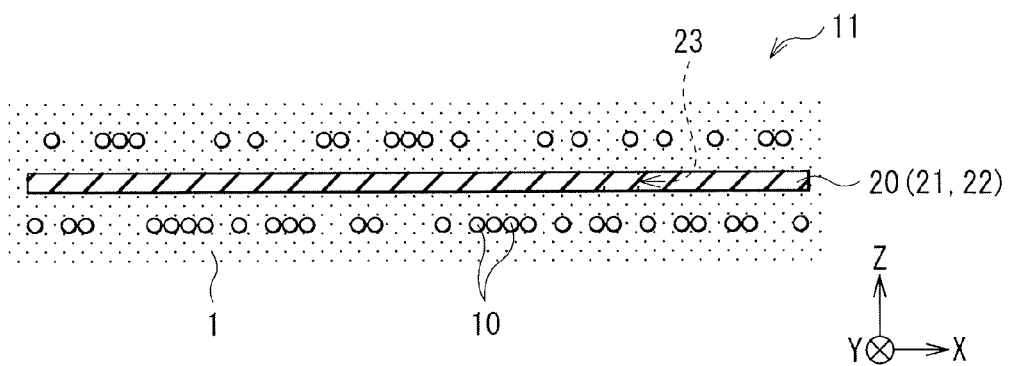
FIG. 2 is a sectional view illustrating a configuration of the electrophoresis device illustrated in FIG. 1.

Some embodiments of the present technology will be described in detail below referring to the accompanying drawings. It is to be noted that description will be given in the following order.
1. Embodiment (Electrophoresis device)
2. Application Examples (Display unit and electronic apparatus)
3. Examples Embodiment FIG. 1 illustrates a planar configuration of an electrophoresis device (an electrophoresis device 11) according to an embodiment of the present technology, and FIG. 2 illustrates a sectional configuration of the electrophoresis device 11. The electrophoresis device 11 is configured to provide contrast with use of an electrophoretic phenomenon, and may be applied to, for example, various electronic apparatuses such as a display unit. The electrophoresis device 11 includes migrating particles 10 and a porous layer 20 having pores 23 in an insulating liquid 1. It is to be noted that FIGS. 1 and 2 schematically illustrate the configuration of the electrophoresis device 11, and dimensions and a shape of the electrophoresis device 11 may be different from actual dimensions and an actual shape.

The insulating liquid 1 may be made of, for example, an organic solvent such as paraffin or isoparaffin. As the insulating liquid 1, one kind of organic solvent or a plurality of kinds of organic solvents may be used. Viscosity and a refractive index of the insulating liquid 1 may be preferably as low as possible. When the viscosity of the insulating liquid 1 is low, mobility (response speed) of the migrating particles 10 is improved. Moreover, energy (power consumption) necessary for movement of the migrating particles 10 is reduced accordingly. When the refractive index of the insulating liquid 1 is low, a difference in refractive index between the insulating liquid 1 and the porous layer 20 is increased to increase light reflectivity of the porous layer 20.

For example, a colorant, a charge control agent, a dispersion stabilizer, a viscosity modifier, a surfactant, a resin, or the like may be added to the insulating liquid 1.

The migrating particles 10 dispersed in the insulating liquid 1 are one or two or more charged particles, and such charged migrating particles 10 move through the pores 23 according to an electric field. The migrating particles 10 have an arbitrary optical reflection property (light reflectivity), and a difference in light reflectivity between the migrating particles 10 and the porous layer 20 provides contrast. For example, display in a bright state may be performed by the migrating particles 10, and display in a dark state may be performed by the porous layer 20, or display in the dark state may be performed by the migrating particles 10 and display in the bright state may be performed by the porous layer 20.

When the electrophoresis device 11 is viewed from outside, the migrating particles 10 may be visually recognized, for example, as white or a color close to white in a case where display in the bright state is performed by the migrating particles 10, and the migrating particles 10 may be visually recognized, for example, as black or a color close to black in a case where display in the dark state is performed by the migrating particles 10. The color of such migrating particles 10 is not specifically limited, as long as contrast is allowed to be provided.

The migrating particles 10 may be configured of, for example, particles (powder) of an organic pigment, an inorganic pigment, a dye, a carbon material, a metal material, a metal oxide, glass, or a polymer material (a resin). For the migrating particles 10, one kind or two or more kinds selected from these materials may be used. The migrating particles 10 may be configured of pulverized particles, capsule particles, or the like of a resin solid including the above-described particles. It is to be noted that a material corresponding to the above-described carbon material, the above-described metal material, the above-described metal oxide, the above-described glass, or the above-described polymer material are excluded from a material corresponding to the organic pigment, the inorganic pigment, or the dye.

Examples of the above-described organic pigment may include azo-based pigments, metal-complex azo-based pigments, polycondensation azo-based pigments, flavanthrone-based pigments, benzimidazolone-based pigments, phthalocyanine-based pigments, quinacridone-based pigments, anthraquinone-based pigments, perylene-based pigments, perinone-based pigments, anthrapyridine-based pigments, pyranthrone-based pigments, dioxazine-based pigments, thioindigo-based pigments, isoindolinone-based pigments, quinophthalone-based pigments, and indanthrene-based pigments. Examples of the inorganic pigments may include zinc white, antimony white, iron black, titanium boride, red iron oxide, Mapico Yellow, minium, cadmium yellow, zinc sulfide, lithopone, barium sulfide, cadmium selenide, calcium carbonate, barium sulfate, lead chromate, lead sulfate, barium carbonate, white lead, and alumina white. Examples of the dyes may include nigrosine-based dyes, azo-based dyes, phthalocyanine-based dyes, quinophthalone-based dyes, anthraquinone-based dyes, and methine-based dyes. Examples of the carbon material may include carbon black. Examples of the metal material may include gold, silver, and copper. Examples of the metal oxide may include titanium oxide, zinc oxide, zirconium oxide, barium titanate, potassium titanate, copper-chromium oxide, copper-manganese oxide, copper-iron-manganese oxide, copper-chromium-manganese oxide, and copper-iron-chromium oxide. Examples of the polymer material may include a polymer compound into which a functional group having a light absorption region in a visible light region is introduced. As long as the polymer compound has the light absorption region in the visible light region, the kind of the polymer compound is not specifically limited.

For example, a specific material of the migrating particles 10 may be selected, based on a role that the migrating particles 10 play in providing contrast. In a case where display in the bright state is performed by the migrating particles 10, for example, a metal oxide such as titanium oxide, zinc oxide, zirconium oxide, barium titanate, or potassium titanate, or the like may be used for the migrating particles 10.

Additional features and advantages are described herein, and will be apparent from the following Detailed Description and the figures.

In a case where display in the dark state is displayed by the migrating particles 10, for example, a carbon material such as carbon black, a metal oxide such as copper-chromium oxide, copper-manganese oxide, copper-iron-manganese oxide, copper-chromium-manganese oxide, and copper-iron-chromium oxide, or the like may be used for the migrating particles 10. In particular, the carbon material may be preferably used for the migrating particles 10. The migrating particles 10 made of the carbon material exhibit high chemical stability, high mobility, and high light absorption.

The content (concentration) of the migrating particles 10 in the insulating liquid 1 may be, for example, but not specifically limited to, within a range of 0.1 wt % to 10 wt % both inclusive. In this concentration range, a shielding property and mobility of the migrating particles 10 are secured. More specifically, when the content of the migrating particles 10 is smaller than 0.1 wt %, the migrating particles 10 are less likely to shield (obscure) the porous layer 20, and there is a possibility that sufficient contrast is not allowed to be provided. On the other hand, when the content of the migrating particles 10 is larger than 10 wt %, dispersibility of the migrating particles 10 decreases; therefore, the migrating particles 10 are less likely to migrate, and the migrating particles 10 may be agglomerated.

It may be preferable that the migrating particles 10 be easily dispersed and charged in the insulating liquid 1 over a long time, and be less likely to be absorbed by the porous layer 20. Therefore, for example, a dispersant may be added to the insulating liquid 1. Moreover, both of the dispersant and a charge control agent may be used.

This dispersant or this charge control agent may have, for example, one or both of a positive charge and a negative charge, and is used to increase a charge amount in the insulating liquid 1 and to disperse the migrating particles 10 by electrostatic repulsion. Examples of such a dispersant may include a Solsperse series manufactured by Lubrizol corp., a BYK series or an Anti-Terra series manufactured by BYK-Chemie, and a Span series manufactured by ICI Americas Inc.

To improve dispersibility of the migrating particles 10, surface treatment may be subjected to the migrating particles 10. Examples of the surface treatment may include rosin treatment, surfactant treatment, pigment derivative treatment, coupling agent treatment, graft polymerization treatment, and microencapsulation treatment. In particular, dispersion stability of the migrating particles 10 is allowed to be maintained for a long time by performing the graft polymerization treatment, the microencapsulation treatment, or a combination thereof.

For such surface treatment, for example, a material (a absorbent material) having a functional group that is absorbable on surfaces of the migrating particles 10 and a polymerizable functional group may be used. The absorbable functional group is determined depending on a formation material of the migrating particles 10. For example, in a case where the migrating particles 10 are made of a carbon material such as carbon black, an aniline derivative such as 4-vinyl aniline is allowed to be absorbed, and in a case where the migrating particles 10 are made of a metal oxide, an organosilane derivative such as 3-(trimethoxy cyril) propyl methacrylate is allowed to be absorbed. Examples of the polymerizable functional group may include a vinyl group, an acrylic group, and a methacryl group.

A polymerizable function group may be introduced into and grafted to the surfaces of the migrating particles 10 to perform surface treatment (a graft material). The graft material may include, for example, a polymerizable functional group and a dispersion functional group. The dispersion functional group allows the migrating particles 10 to be dispersed in the insulating liquid 1, and allows dispersibility to be maintained by steric hindrance thereof. For example, in a case where the insulating liquid 1 is paraffin, a branched alkyl group or the like may be used as the dispersion functional group. Examples of the polymerizable functional group may include a vinyl group, an acrylic group, and a methacryl group. For example, a polymerization initiator such as azobisisobutyronitrile (AIBN) may be used for polymerization and grafting of the graft material.

A method of dispersing the above-described migrating particles 10 in the insulating liquid 1 is described in detail in books such as "Dispersion Technique of Ultrafine Particles and Evaluation Thereof: Surface Treatment, Pulverizing, and Dispersion Stabilization in Gas, Liquid, and Polymer" published by Science & technology Co., Ltd.

The porous layer 20 is capable of shielding the migrating particles 10, and includes a fibrous structure 21 and non-migrating particles 22 held by the fibrous structure 21. The porous layer 20 is a three-dimensional steric structure (an irregular network structure such as a nonwoven fabric) formed of the fibrous structure 21, and has a plurality of openings (pores 23). When the three-dimensional steric structure of the porous layer 20 is configured of the fibrous structure 21, light (outside light) is diffused (multiply scattered) to cause an increase in light reflectivity of the porous layer 20. Therefore, even if the thickness of the porous layer 20 is small, high reflectivity is obtainable, and while contrast of the electrophoresis device 11 is improved, energy necessary to move the migrating particles 10 is allowed to be reduced. Moreover, an average pore diameter of the pores 23 is increased, and a large number of the pores 23 are provided to the porous layer 20. Therefore, while the migrating particles 10 easily move through the pores 23 to improve response speed, energy necessary to move the migrating particles 10 is reduced. A thickness of such a porous layer 20 may be, for example, from 5 μm to 100 μm both inclusive.

The fibrous structure 21 is a fibrous material having a sufficient length with respect to a fiber diameter (a diameter). For example, a plurality of fibrous structures 21 may be gathered in a randomly overlapped manner to form the porous layer 20. One fibrous structure 21 may be randomly tangled to form the porous layer 20. Alternatively, the porous layer 20 configured of one fibrous structure 21 and the porous layer 20 configured of a plurality of fibrous structures 21 may be mixed. In this embodiment, the fibrous structure 21 has a potential opposite to that of the migrating particles 10. In other words, when the migrating particles 10 is positively charged (a positive potential), the fibrous structure 21 is negatively charged (a negative potential), and when the migrating particles 10 are negatively charged, the fibrous structure 21 is positively charged. Therefore, as will be described in detail later, the contrast and response speed of the electrophoresis device 11 are allowed to be improved. It is to be noted that the potential is zero at an electrically neutral position that is sufficiently departed from the migrating particles 10 and fibrous structure 21.

The fibrous structure 21 may be made of, for example, a polymer material, an inorganic material, or the like. Examples of the polymer material may include nylon, polylactic acid, polyamide, polyimide, polyethylene terephthalate, polyacrylonitrile, polyethylene oxide, polyvinyl carbazole, polyvinyl chloride, polyurethane, polystyrene, polyvinyl alcohol, polysulfone, polyvinylpyrrolidone, polyvinylidene fluoride, polyhexafluoropropylene, cellulose acetate, collagen, gelatin, chitosan, and copolymers thereof. Examples of the inorganic material may include titanium oxide. The polymer material may be preferably used for the fibrous structure 21. This is because the polymer material has, for example, low reactivity with respect to light or the like and is chemically stable. In other words, unintentional decomposition reaction of the fibrous structure 21 is allowed to be prevented by using the polymer material. In a case where the fibrous structure 21 is made of a highly reactive material, a surface of the fibrous structure 21 may be preferably covered with an arbitrary protective layer.

For example, a functional group having a charge opposite to that of the migrating particles 10 may be introduced into the fibrous structure 21 made of the polymer material. Therefore, the potential of the fibrous structure 21 is allowed to be adjusted. The fibrous structure 21 with a positive potential may include, for example, an amino group, an amide group, or the like, and the fibrous structure 21 with a negative potential may include, for example, a sulfonic acid group, a phosphoric acid group, a carbonate group, a cyano group, a hydroxyl group, or the like. A sulfonic acid group having a large negative charge easily allows the fibrous structure 21 to have a negative potential. Such a functional group may be used in a salt form. At this time, for example, elution of the salt into the insulating liquid 1 may be prevented from affecting display. When the fibrous structure 21 and the migrating particles 10 are allowed to stably exist in the insulating liquid 1, any amount of the functional group may be introduced, and the amount of the functional group may be desirably as large as possible to increase a charge amount of the fibrous structure 21. The functional group may be introduced into any position of a polymer chain, and may exist at an end or a middle portion of the polymer chain. A molecular weight of the polymer material used for the fibrous structure 21 may be preferably 70000 or more in terms of stability.

Figure 3A:
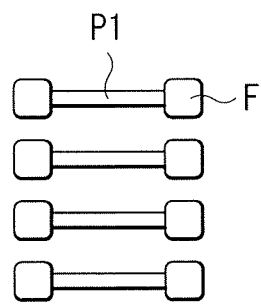
FIG. 3A is a schematic view for describing a configuration of a fibrous structure illustrated in FIG. 1.
Figure 3B:
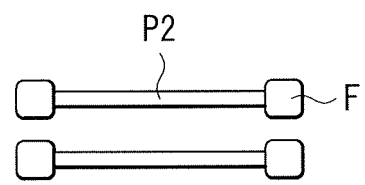
FIG. 3B is a schematic view illustrating another example of the fibrous structure illustrated in FIG. 3A.

FIG. 3A schematically illustrates a case where the porous layer 20 is formed with use of a polymer chain P1 with a relatively small molecular weight, and FIG. 3B schematically illustrates a case where the porous layer 20 is formed with use of a polymer chain P2 with a relatively large molecular weight. To configure the porous layer 20 in a same state, a larger number of polymer chains P1 than the number of polymer chains P2 are necessary. Therefore, in a case where the number of functional groups F introduced into one polymer chain P1 and the number of functional groups F introduced into one polymer chain P2 are equal to each other, when the polymer chain P1 with a smaller molecular weight is used, a larger number of functional groups F exist in the porous layer 20. In other words, when the polymer chain P1 is used, a mass concentration of the functional group F in the insulating liquid is increased; therefore, the charge amount is allowed to be increased.

For example, the fibrous structure 21 may extend linearly. The fibrous structure 21 may have any shape, for example, may be curled, or bent at some point. Alternatively, the fibrous structure 21 may be branched at some point.

An average fiber diameter of the fibrous structure 21 may be from 50 nm to 2000 nm both inclusive, but may be out of the above-described range. When the average fiber diameter is reduced, light is easily diffused, and the diameter of the pore 23 is increased. The fiber diameter of the fibrous structure 21 is so determined as to allow the fibrous structure 21 to hold the non-migrating particles 22. The average fiber diameter may be measured by, for example, microscopic observation with use of a scanning electron microscope or the like. An average length of the fibrous structure 21 is arbitrarily set. The fibrous structure 21 may be formed by, for example, a phase separation method, a phase inversion method, an electrostatic (electric field) spinning method, a melt spinning method, a wet spinning method, a dry spinning method, a gel spinning method, a sol-gel method, a spray coating method, or the like. When such a method is used, the fibrous structure 21 with a sufficient length with respect to the fiber diameter is allowed to be formed easily and stably.

The fibrous structure 21 may be preferably configured of nanofibers. In this case, the nanofibers have a fiber diameter of 1 nm to 100 nm both inclusive and a length that is 100 or more times as large as the fiber diameter. When such nanofibers are used, light is easily diffused, and light reflectivity of the porous layer 20 is allowed to be further improved. In other words, contrast of the electrophoresis device 11 is allowed to be improved. Moreover, in the fibrous structure 21 made of nanofibers, the ratio of the pores 23 in a unit volume is increased, and the migrating particles 10 easily move through the pores 23 accordingly. Therefore, energy necessary to move the migrating particles 10 is allowed to be reduced. The fibrous structure 21 made of nanofibers may be preferably formed by an electrostatic spinning method. The fibrous structure 21 with a small fiber diameter is allowed to be formed easily and stably by using the electrostatic spinning method.

The fibrous structure 21 with light reflectivity different from light reflectivity of the migrating particles 10 may be preferably used. By doing so, contrast by a difference in light reflectivity between the porous layer 20 and the migrating particles 10 is easily formed. In a case where the fibrous structure 21 does not substantially affect light reflectivity of the porous layer 20, i.e., in a case where light reflectivity of the porous layer 20 is determined by the non-migrating particles 22, the fibrous structure 21 exhibiting light transparency (colorless and transparent) may be used in the insulating liquid 1.

The pores 23 are formed by a plurality of fibrous structures 21 overlapping one another or one tangled fibrous structure 21. The pores 23 may preferably have a largest possible average pore diameter so as to allow the migrating particles 10 to easily move through the pores 23. The average pore diameter of the pore 23 may be, for example, from 0.1 µm to 10 µm both inclusive.

The non-migrating particles 22 are fixed in the fibrous structure 21, and are one or two or more particles that do not electrically migrate. The non-migrating particles 22 may be embedded inside the fibrous structure 21 holding the non-migrating particles 22, or may be exposed in part from the fibrous structure 21.

The non-migrating particles 22 with light reflectivity different from that of the migrating particles 10 may be preferably used. The non-migrating particles 22 may be made of a material similar to that of the above-described migrating particles 10. More specifically, in a case where display in the bright state is performed by the non-migrating particles 22 (the porous layer 20), the material of the above-described migrating particles 10 used in a case where display in the bright state is performed by the migrating particles 10 is allowed to be used, and in a case where display in the dark state is performed by the non-migrating particles 22, the material of the above-described migrating particles 10 used in a case where display in the dark state is performed by the migrating particles 10 is allowed to be used. When display in the bright state is performed by the porous layer 20, the non-migrating particles 22 may be preferably made of a metal oxide. By doing so, high chemical stability, high fixity, and high light reflectivity are allowed to be obtained. The constituent materials of the non-migrating particles 22 and the migrating particles 10 may be the same as or different from each other. A color visually recognized when display in the bright state or display in the dark state is performed by the non-migrating particles 22 is similar to that in the description of the above-described migrating particles 10.

The non-migrating particles 22 may preferably have the same charge as that of the fibrous structure 21. By doing so, the positive potential or the negative potential of the fibrous structure 21 is allowed to be enhanced, and contrast and response speed are allowed to be further improved.

Such a porous layer 20 may be formed by, for example, the following method. First, for example, a spinning solution is prepared by dissolving the constituent material such as a polymer material of the fibrous structure 21 in an organic solvent or the like. Next, the non-migrating particles 22 are added to this spinning solution, and then the spinning solution is sufficiently stirred to disperse the non-migrating particles 22. Finally, spinning is performed with use of the spinning solution by, for example, an electrostatic spinning method to fix the non-migrating particles 22 to the fibrous structure 21, thereby forming the porous layer 20. The porous layer 20 may be formed by performing hole drilling on a polymer film with use of a laser to form the pores 23, and a fabric that is woven from synthetic fibers or the like, an open-cell foam porous polymer, or the like may be used for the porous layer 20.

As described above, the electrophoresis device 11 is configured to provide contrast by a difference in light reflectivity between the migrating particles 10 and the porous layer 20. More specifically, light reflectivity of one that performs display in the bright state of the migrating particles 10 and the porous layer 20 is higher than light reflectivity of the other that performs display in the dark state. The light reflectivity of the non-migrating particles 22 may be preferably higher than that of the migrating particles 10 to allow display in the bright state and display in the dark state to be performed by the porous layer 20 and the migrating particles 10, respectively. By performing such display, the light reflectivity when display in the bright state is performed is extremely high with use of light diffusion by the porous layer 20 (a three-dimensional steric structure). Therefore, contrast is remarkably improved accordingly.

In the electrophoresis device 11, the migrating particles 10 move through the pores 23 of the porous layer 20 within a range where an electric field is applied. One of display in the bright state and display in the dark state is performed according to a region where the migrating particles 10 move and a region where the migrating particles 10 do not move to display an image. In this case, the fibrous structure 21 configuring the porous layer 20 is charged oppositely to the migrating particles 10; therefore, contrast and response speed are allowed to be improved. A case where display in the bright state and display in the dark state are performed by the porous layer 20 and the migrating particles 10, respectively, will be described below as an example.

To increase light reflectivity of the porous layer, i.e., white reflectivity, a method of increasing the amount of the non-migrating particles or the fibrous structure is considered. Contrast is allowed to be improved by increasing white reflectivity. However, when the amount of the non-migrating particles is increased while the amount of the fibrous structure is fixed, the migrating particles are not allowed to pass through the pores of the porous layer and be stuck, thereby causing a reduction in dispersibility. In this state, efficient dispersion is not allowed to be performed, and white reflectivity is not allowed to be increased. On the other hand, when the amount of the fibrous structures is increased to thickly laminate the fibrous structures, the amount of the non-migrating particles is allowed to be increased; however, a moving distance of the migrating particles is increased, and response speed is reduced. Therefore, in this method, white reflectivity (contrast) and response speed have a trade-off relationship therebetween; therefore, display quality is not allowed to be improved.

On the other hand, in the electrophoresis device 11, the fibrous structure 21 is charged oppositely to the migrating particles 10; therefore, white reflectivity and response speed are allowed to be improved without increasing the amounts of the non-migrating particles 22 and the fibrous structure 21. It is considered that this is caused by the following reason. Since the migrating particles 10 and the fibrous structure 21 are charged oppositely to each other, the migrating particles 10 and the fibrous structure 21 are surrounded by a material having both a positive charge and a negative charge, for example, a dispersant in the insulating liquid 1. Therefore, proximity and contact of the migrating particles 10 and the fibrous structure 21 are suppressed, and the migrating particles 10 easily pass through the pores 23. Therefore, white reflectivity and response speed are allowed to be increased without increasing the amounts of the fibrous structure 21 and the non-migrating particles 22.

As described above, in the electrophoresis device 11 according to this embodiment, the fibrous structure 21 is charged oppositely to the migrating particles 10; therefore, contrast and response speed are allowed to be improved.

Application Examples (Display Unit)

Next, application examples of the above-described electrophoresis device 11 will be described below. The electrophoresis device 11 may be applied to, for example, a display unit.

Figure 4:
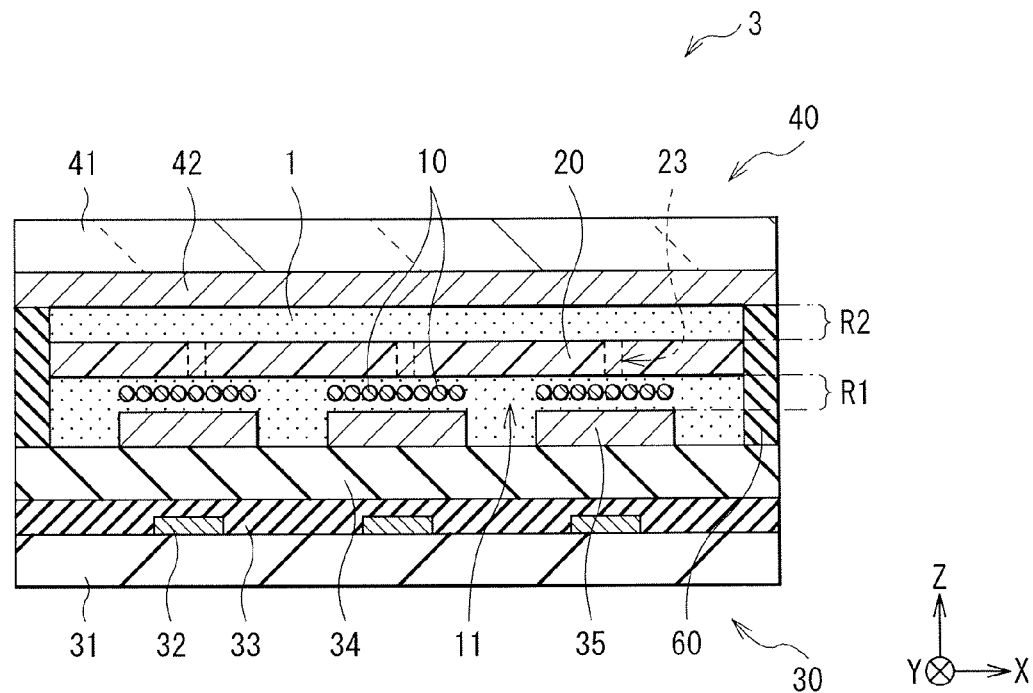

FIG. 4 illustrates an example of a sectional configuration of a display unit (a display unit 3) using the electrophoresis device 11. This display unit 3 is an electrophoretic display (a so-called electronic paper display) displaying an image (for example, textual information) with use of an electrophoretic phenomenon, and includes the electrophoresis device 11 between a drive substrate 30 and a counter substrate 40. A distance between the drive substrate 30 and the counter substrate 40 is adjusted to a predetermined distance by a spacer 60.

The drive substrate 30 may include, for example, TFTs (Thin Film Transistors) 32, a protective layer 33, a planarization insulating layer 34, and pixel electrodes 35 in this order on one surface of a plate-like member 31. The TFTs 32 and the pixel electrodes 35 may be arranged, for example, in a matrix form or a segment form according to a pixel arrangement.

The plate-like member 31 may be made of, for example, an inorganic material, a metal material, a plastic material, or the like. Examples of the inorganic material may include silicon (Si), silicon oxide ($SiO_x$), silicon nitride ($SiN_x$), and aluminum oxide ($AlO_x$). As the silicon oxide, glass, spin-on glass (SOG), and the like are included. Examples of the metal material may include aluminum (Al), nickel (Ni), and stainless steel, and examples of the plastic material may include polycarbonate (PC), polyethylene terephthalate (PET), polyethylene naphthalate (PEN), and poly ether ether ketone (PEEK).

In the display unit 3, since an image is displayed on the counter substrate 40 side, the plate-like member 31 may be impermeable to light. The plate-like member 31 may be configured of a substrate with stiffness such as a wafer or may be configured of thin-layer glass, a film or the like having flexibility. A flexible (foldable) display unit 3 is achievable by using a flexible material for the plate-like member 31.

The TFT 32 is a switching device for selecting a pixel. The TFT 32 may be an inorganic TFT using an inorganic semiconductor layer as a channel layer or an organic TFT using an organic semiconductor layer. The protective layer 33 and the planarization insulating layer 34 may be made of, for example, an insulating resin material such as polyimide. As long as a surface of the protective layer 33 is sufficiently flat, the planarization insulating layer 34 may be omitted. The pixel electrode 35 may be formed of, for example, a metal material such as gold (Au), silver (Ag), or copper (Cu). The pixel electrode 35 is connected to the TFT 32 through a contact hole (not illustrated) provided in the protective layer 33 and the planarization insulating layer 34.

The counter substrate 40 may include, for example, a plate-like member 41 and a counter electrode 42, and the counter electrode 42 is provided on an entire surface (a surface facing the drive substrate 30) of the plate-like member 41. The counter electrode 42 may be arranged in a matrix form or a segment form as with the pixel electrode 32.

The plate-like member 41 is made of a material similar to that of the plate-like member 31, except that the plate-like member 41 is transparent to light. For the counter electrode 42, for example, a light-transmissive conductive material (a transparent electrode material) such as indium oxide-tin oxide (ITO), antimony oxide-tin oxide (ATO), fluorine-doped tin oxide (FTO), or aluminum-doped zinc oxide (AZO) may be used.

In a case where an image is displayed on the counter substrate 40 side, the electrophoresis device 11 is viewed through the counter electrode 42; therefore, the light transparency (transmittance) of the counter electrode 42 may be preferably as high as possible, and may be, for example, 80% or more. Moreover, electrical resistance of the counter electrode 42 may be preferably as low as possible, and may be, for example, 100 Ω/sq or less.

The electrophoresis device 11 has a configuration similar to that of the electrophoresis device 11 of the above-described embodiment. More specifically, the electrophoresis device 11 includes the migration particles 10 and the porous layer 20 having a plurality of pores 23 in the insulating liquid 1. A space between the drive substrate 30 and the counter substrate 40 is filled with the insulating liquid 1, and the porous layer 20 may be supported by, for example, the spacer 60. For example, the space filled with the insulating liquid 1 may be partitioned by the porous layer 20 as a boundary into an escape region R1 on a side closer to the pixel electrode 35 and a display region R2 on a side closer to the counter electrode 42. The configurations of the insulating liquid 1, the migrating particles 10, and the porous layer 20 are similar to those described in the above-described embodiment. It is to be noted that, in FIG. 4 and FIG. 5 that will be described later, for simplification of the diagrams, only a part of the pores 23 are illustrated.

The porous layer 20 may be adjacent to one of the pixel electrodes 35 and the counter electrode 42, and the escape region R1 and the display region R2 may not be clearly partitioned. The migrating particles 10 move toward the pixel electrodes 35 or the counter electrode 42 according to an electric field.

A thickness of the spacer 60 may be, for example, from 10 μm to 100 μm both inclusive, and may be preferably as thin as possible. Accordingly, power consumption is allowed to be reduced. The spacer 60 may be made of, for example, an insulating material such as a polymer material, and may be arranged in, for example, a grid pattern between the drive substrate 30 and the counter substrate 40. The arrangement shape of the spacer 60 is not specifically limited; however, the spacer 60 may be preferably so arranged as not to interfere with movement of the migrating particles 10 and as to uniformly distribute the migrating particles 10.

In an initial state of the display unit 3, the migrating particles 10 are located in the escape region R1 (refer to FIG. 4). In this case, the migrating particles 10 are shielded by the porous layer 20 in all pixels; therefore, when the electrophoresis device 11 is viewed from the counter substrate 40 side, the display unit 3 is in a state in which contrast is not provided (an image is not displayed).

Figure 5:
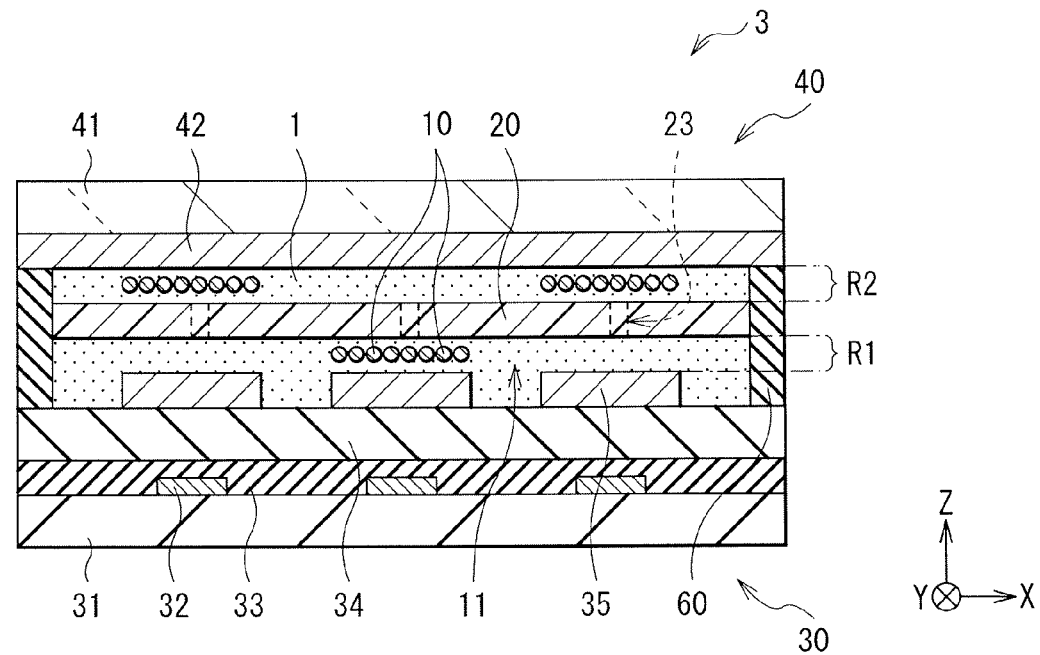
FIG. 5 is a sectional view for describing an operation of the display unit illustrated in FIG. 4.

On the other hand, when pixels are selected by the TFTs 32, and an electric field is applied between the pixel electrodes 35 and the counter electrode 42, as illustrated in FIG. 5, in each of the pixels, the migrating particles 11 move from the escape region R1 to the display region R2 through the porous layer 20 (the pores 23). In this case, pixels in which the migrating particles 10 are shielded by the porous layer 20 and pixels in which the migrating particles 10 are not shielded by the porous layer 20 coexist; therefore, when the electrophoresis device 11 is viewed from the counter substrate 40 side, the display unit 3 is in a state in which contrast is provided. Therefore, an image is displayed.

According to this display unit 3, high contrast and high-speed response are achieved by the electrophoresis device 11 of the above-described embodiment. Therefore, for example, a high-quality image suitable for colorization and moving image display may be displayed.

Application Examples (Electronic Apparatuses)

Next, application examples of the above-described display unit 3 will be described below.

The display unit 3 of the present technology is applicable to electronic apparatuses for various purposes, and the kinds of the electronic apparatuses are not specifically limited. This display unit 3 may be mounted in, for example, the following electronic apparatuses. However, the configurations of the electronic apparatuses that will be described below are merely examples, and may be modified as appropriate.

Application Example 1

Figure 6A:
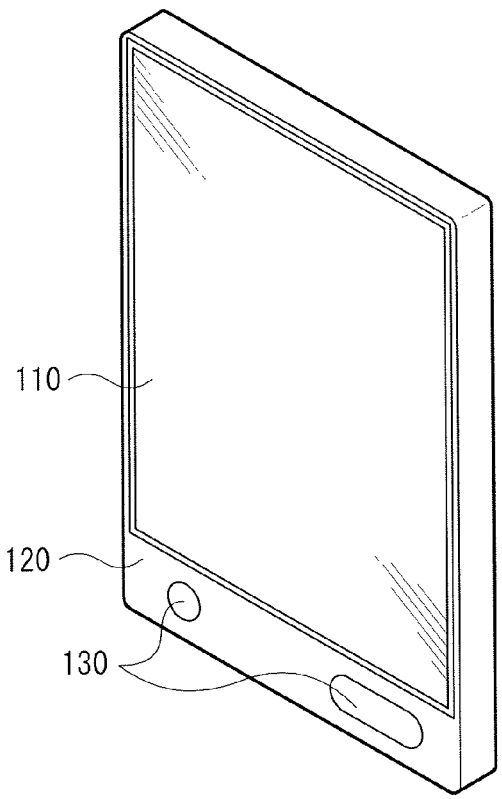
FIG. 6A is a perspective view illustrating an appearance of Application Example 1.
Figure 6B:
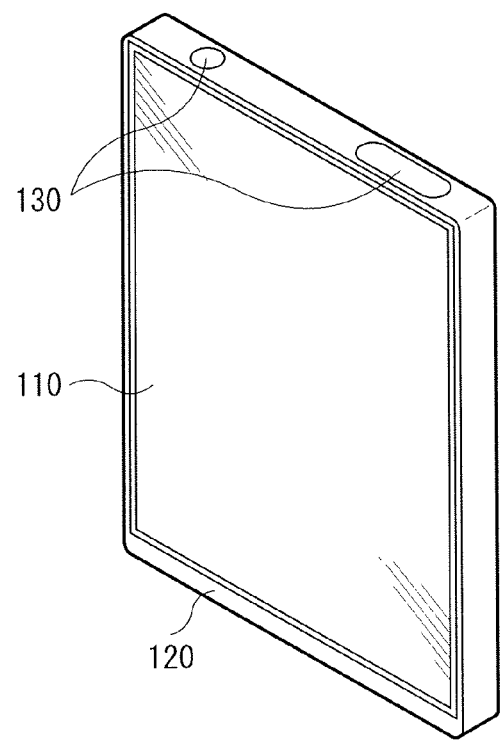
FIG. 6B is a perspective view illustrating another example of an electronic book illustrated in FIG. 6A.

FIGS. 6A and 6B illustrate an appearance of an electronic book. The electronic book may include, for example, a display section 110, a non-display section 120, and an operation section 130. It is to be noted that the operation section 130 may be disposed on a front surface of the non-display section 120 as illustrated in FIG. 6A or may be disposed on a top surface of the non-display section 120 as illustrated in FIG. 6B. The display section 110 is configured of the display unit 3. It is to be noted that the display unit 3 may be mounted in a PDA (Personal Digital Assistants) with a configuration similar to that of the electronic book illustrated in FIGS. 6A and 6B.

Application Example 2

Figure 7:
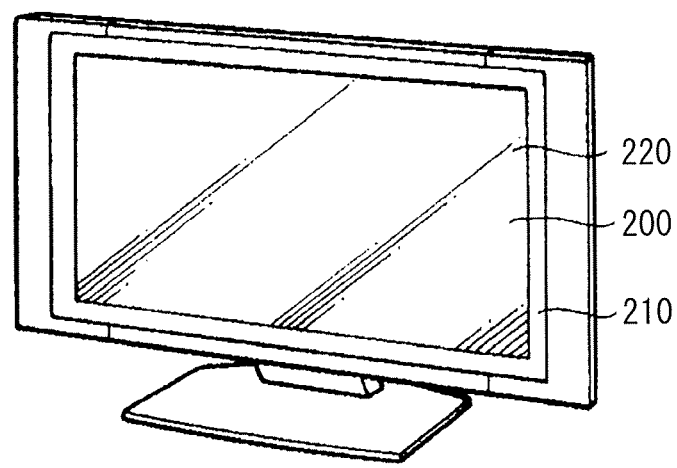
FIG. 7 is a perspective view illustrating an appearance of Application Example 2.

FIG. 7 illustrates an appearance of a television. The television may include, for example, an image display screen section 200 including a front panel 210 and a filter glass 220. The image display screen section 200 is configured of the display unit 3.

Application Example 3

Figure 8:
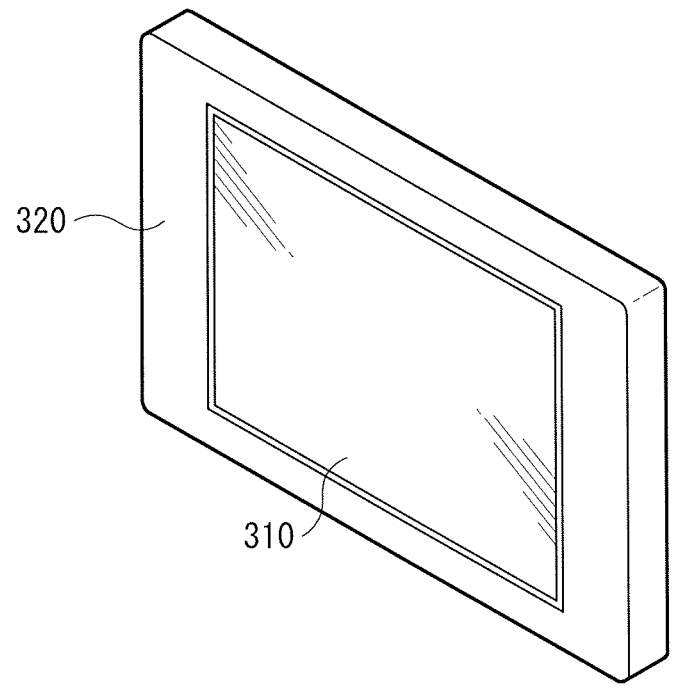
FIG. 8 is a perspective view illustrating an appearance of Application Example 3.

FIG. 8 illustrates an appearance of a tablet personal computer. The tablet personal computer may include, for example, a touch panel section 310 and an enclosure 320, and the touch panel section 310 is configured of the above-described display unit 3.

Application Example 4

Figure 9A:
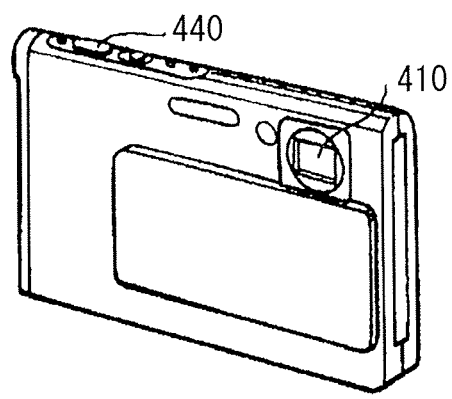
FIG. 9A is a perspective view illustrating an appearance viewed from a front side of Application Example 4.
Figure 9B:
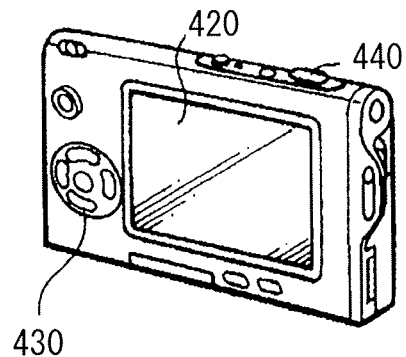
FIG. 9B is a perspective view illustrating an appearance viewed from a back side of Application Example 4.

FIGS. 9A and 9B illustrate an appearance of a digital still camera, where FIG. 9A illustrates a front surface, and FIG. 9B illustrates a back surface. The digital still camera may include, for example, a light-emitting section 410 for a flash, a display section 420, a menu switch 430, and a shutter button 440. The display section 420 is configured of the display unit 3.

Application Example 5

Figure 10:
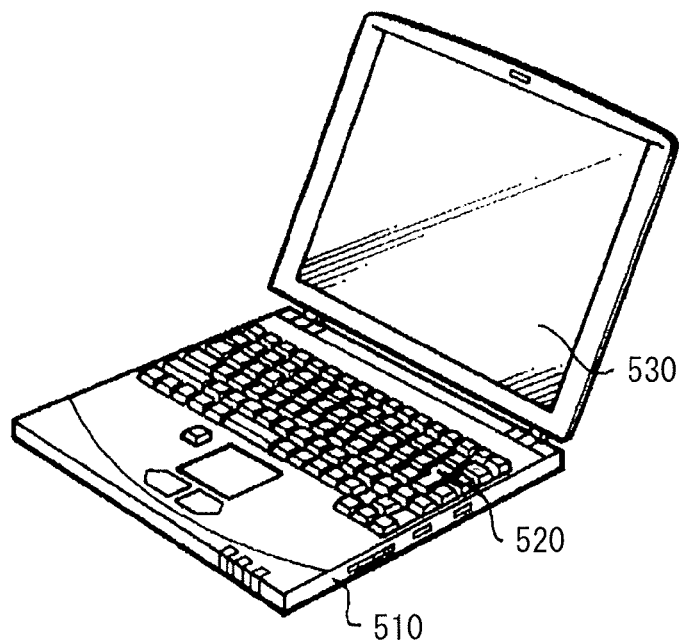
FIG. 10 is a perspective view illustrating an appearance of Application Example 5.

FIG. 10 illustrates an appearance of a notebook personal computer. The notebook personal computer may include, for example, a main body 510, a keyboard 520 for operation of inputting characters and the like, and a display section 530 for displaying of an image. The display section 530 is configured of the display unit 3.

Application Example 6

Figure 11:
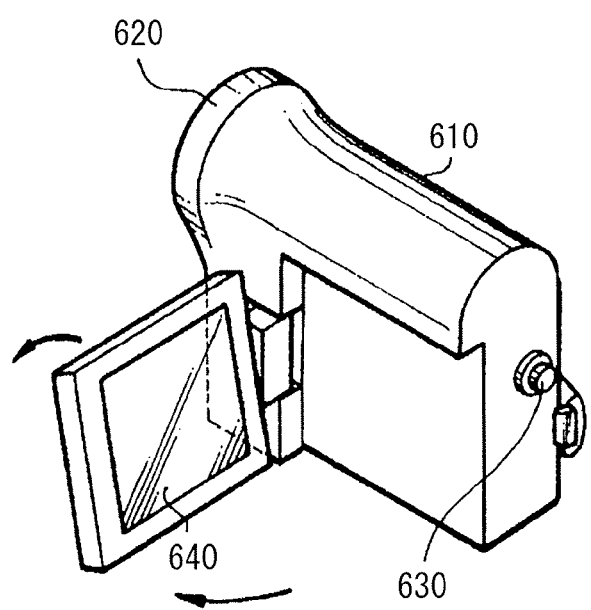
FIG. 11 is a perspective view illustrating an appearance of Application Example 6.

FIG. 11 illustrates an appearance of a video camera. The video camera may include, for example, a main section 610, a lens 620 provided on a front surface of the main section 610 and for shooting of an image of an object, a shooting start/stop switch 630, and a display section 640. The display section 640 is configured of the display unit 3.

Application Example 7

Figure 12A:
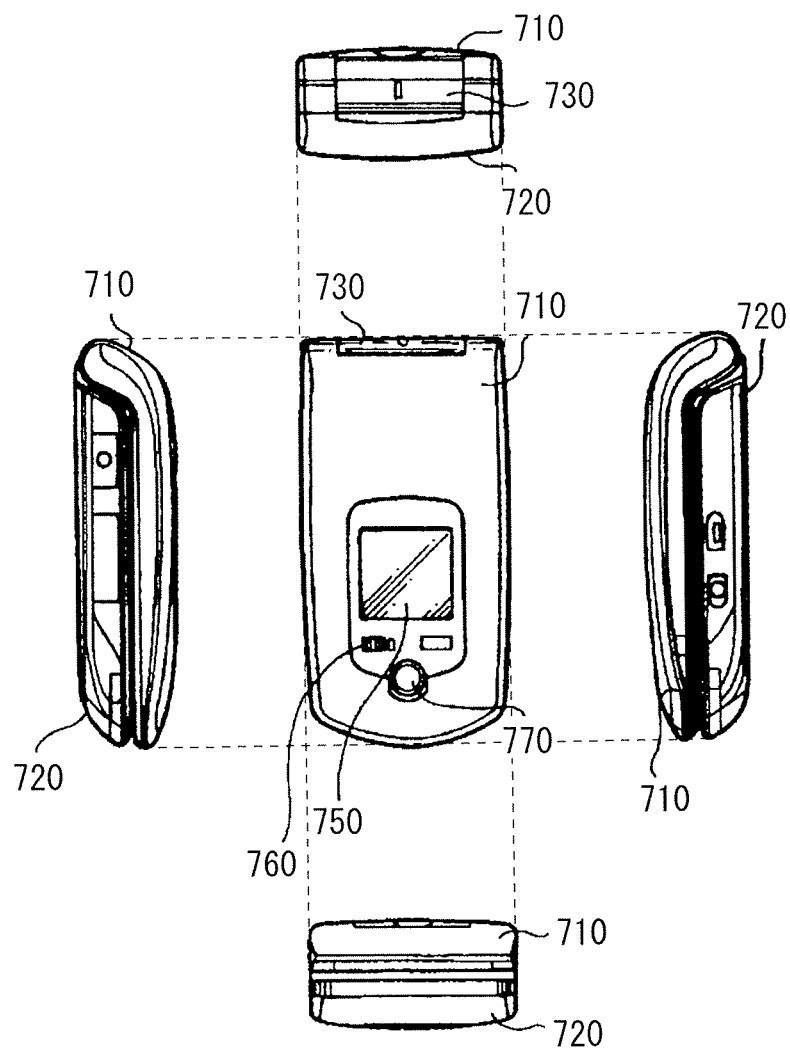
FIG. 12A is a front view, a left side view, a right side view, a top view, and a bottom view in a state in which Application Example 7 is closed.
Figure 12B:
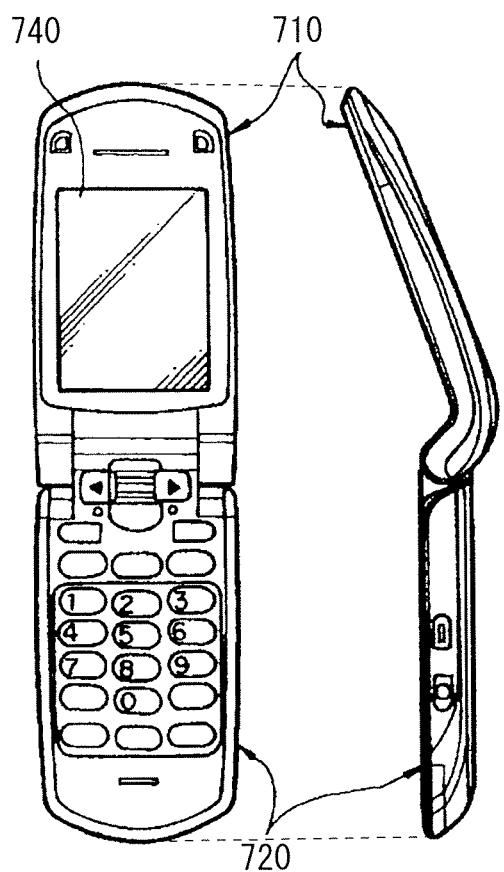
FIG. 12B is a front view and a side view in a state in which Application Example 7 is opened.

FIGS. 12A and 12B illustrate an appearance of a cellular phone. FIG. 12A illustrates a front surface, a left side surface, a right side surface, a top surface, and a bottom surface in a state in which the cellular phone is closed, and FIG. 12B is a front surface and a side surface in a state in which the cellular phone is opened. The cellular phone may be configured by connecting, for example, a top-side enclosure 710 and a bottom-side enclosure 720 to each other by a connection section (hinge section) 730, and the cellular phone may include a display 740, a sub-display 750, a picture light 760, and a camera 770. The display 740 or the sub-display 750 is configured of the display unit 3.

EXAMPLES

Next, examples of the present technology will be described in detail below.

Experimental Example 1

A display unit was fabricated with use of black migrating particles and a white porous layer (a particle-containing fibrous structure) by the following procedure.

First, after 42.624 g of sodium hydroxide and 0.369 g of sodium silicate were dissolved in 43 g of water, 5 g of complex oxide microparticles (an oxide of copper-iron-manganese; Daipyroxide color TM3550 manufactured by Dainichiseika Color & Chemicals Mfg. Co., Ltd.) was added to this solution while stirring the solution. After this solution was stirred for 15 minutes, ultrasonic stirring (at 30° C. to 35° C. for 15 minutes) was performed. Next, after this dispersion liquid of the complex oxide microparticles was heated at 90° C., 15 $cm^3$ (mL) of sulfuric acid of 0.22 $mol/cm^3$, and 7.5 $cm^3$ of a solution in which 6.5 mg of sodium silicate and 1.3 mg of sodium hydroxide were dissolved were dropped into the dispersion liquid for 2 hours. After that, this dispersion liquid was cooled to a room temperature, 1.8 $cm^3$ of sulfuric acid of 1 $mol/cm^3$ was added to the dispersion liquid, and centrifugal separation (at 3700 rpm for 30 minutes) and decantation were performed. Next, a deposit after this decantation was redispersed in ethanol, and centrifugal separation (at 3500 rpm for 30 minutes) and decantation were performed. A deposit obtained by repeating this cleaning operation twice was put into a bottle, and a mixed liquid of 5 $cm^3$ of ethanol and 0.5 $cm^3$ of water was added to this bottle, and ultrasonic stirring (for 1 hour) was performed. Thus, a dispersion solution of silane-coated complex oxide particles was obtained.

Next, an entire amount of the above-described dispersion solution of silane-coated complex oxide particles was added to a solution prepared by mixing 3 $cm^3$ of water, 30 $cm^3$ of ethanol, and 4 g of N-[3-(trimethoxysilyl)propyl]-N'-(4-vinylbenzil)ethylenediamine hydrochloride salt (a 40% methanol solution) and stirring them for 7 minutes. Then, after this mixed liquid was stirred for 10 minutes, centrifugal separation (at 3500 rpm for 30 minutes) and decantation were performed. After that, a deposit after this decantation was redispersed in ethanol, and centrifugal separation (at 3500 rpm for 30 minutes) and decantation were performed. A deposit obtained by repeating this cleaning operation twice was dried for 6 hours in a reduced pressure environment at a room temperature, and was further dried for 2 hours in a reduced pressure environment at 70° C., and a solid material was thereby obtained.

Next, after 50 $cm^3$ of toluene was added to the solid material, and they were stirred for 12 hours by a roll mill, this resultant was moved into a three-necked flask, and 1.7 g of 2-ethylhexyl acrylate was added thereto, and the resultant was stirred under a nitrogen stream for 20 minutes. Next, after this mixed liquid was stirred at 50° C. for 20 minutes, 3 $cm^3$ of a toluene solution containing 0.01 g of AIBN was added to the mixed liquid, and the mixed liquid was heated at 65° C. Next, after the mixed liquid was stirred for 1 hour, the mixed liquid was cooled to a room temperature, and was put into a bottle together with ethyl acetate. After centrifugal separation (at 3500 rpm for 30 minutes) was performed on this bottle, and decantation was performed, a deposit after decantation was redispersed in ethyl acetate, and centrifugal separation (at 3500 rpm for 30 minutes) and decantation were performed. After this cleaning operation by ethyl acetate was repeated three times, a deposit obtained was dried for 12 hours in a reduced pressure environment at a room temperature, and was further dried for 2 hours in a reduced pressure environment at 70° C. By the above processes, black migrating particles made of a polymer-coated pigment were obtained.

After the migrating particles were prepared, an insulating liquid containing 0.5% of methoxysulfonyloxymethane (Solsperse 17000 manufactured by Lubrizol Co.) and 1.5% of sorbitan laurate (Span20) as a dispersant and a charge control agent was prepared. As the insulating liquid, isoparaffin (IsoparG, manufactured by Exxon Mobil Corporation)

was used. After 0.1 g of the above-described migrating particles was added to 9.9 g of this solution, and this solution was stirred for 5 minutes in a bead mill, zirconia beads (with a diameter of 0.03 mm) were added thereto, and the solution was stirred for 4 hours by a homogenizer. After that, the zirconia beads were removed, and when an average particle diameter of the migrating particles was measured, the average particle diameter was 100 nm. For the measurement of the average particle diameter, a zeta-potential & particle size analyzer ELSZ-2 (manufactured by Otsuka Electronics Co., Ltd.) was used.

On the other hand, the porous layer was formed as follows. First, a polyacrylonitrile A was prepared as a constituent material of the fibrous structure. The polyacrylonitrile A was so prepared as to allow a sulfonic acid group as a functional group providing a negative charge to be introduced into all ends of a polymer chain thereof. After 17 g of this polyacrylonitrile A was dissolved in 83 g of N,N'-dimethylformamide, 30 g of titanium oxide (TITONE R-45M manufactured by Sakai Chemical Industry Co., Ltd.) as non-migrating particles was added to 70 g of this solution, and was mixed by a bead mill. Thus, a spinning solution for forming the fibrous structure was obtained. Next, this spinning solution was put into a syringe, spinning for a thickness of 40 μm was performed on a drive substrate. Pixel electrodes made of ITO in a predetermined pattern were provided to the drive substrate. The spinning was performed with use of an electrospinning apparatus (NANON manufactured by MECC Co., Ltd.) under electric field intensity of 28 kV, a discharge rate of 0.5 cm³/min, a spinning distance of 15 cm, and a scan rate of 20 mm/sec. After spinning was performed, the drive substrate was dried in a vacuum oven at 75° C. to form the porous layer (the fibrous structure holding the non-migrating particles) on the drive substrate. The porosity of the porous layer was calculated from the thickness and the weight of the fibrous structure. A surface potential of the fibrous structure was measured with use of a zeta-potential measuring instrument for surface analysis (SurPASS manufactured by Anton Paar). A value of the surface potential was determined with use of a value at pH 7 as a reference.

After the porous layer was formed on the drive substrate, an unnecessary portion of the porous layer was removed from the drive substrate. More specifically, a portion where the pixel electrode was not provided of the porous layer was removed. The counter electrode made of ITO formed on a plate-like member was formed as the counter substrate, and a spacer was provided on the counter substrate. For the spacer, a spacer drawn with use of a photocurable resin (a photosensitive resin Photolec A-400 (registered trademark) manufactured by Sekisui Chemical Co., Ltd.) containing beads (with an outer diameter of 30 μm) was used, and was provided in a position not overlapping the porous layer when the spacer overlapped the drive substrate. After the spacer was provided to the counter substrate, the counter substrate overlapped the drive substrate where the porous layer was formed. At that time, the porous layer was so separated from the pixel electrodes and the counter electrode by the spacer as to hold the porous layer. Next, an insulating liquid in which the above-described migrating particles were dispersed was injected between the drive substrate and the counter substrate. Finally, the photocurable resin was irradiated with ultraviolet light to complete the display unit.

Experimental Example 2

A display unit was fabricated by a procedure similar to that of Experimental Example 1, except that instead of 17 g of the polyacrylonitrile A and 83 g of N,N'-dimethylformamide, 13 g of a polyacrylonitrile B having a different molecular weight from that of the polyacrylonitrile A and 87 g of N,N'-dimethylformamide were used. The polyacrylonitrile B was so prepared as to allow a sulfonic acid group to be introduced into all ends of a polymer chain thereof.

Experimental Example 3

A display unit was fabricated by a procedure similar to that of Experimental Example 1, except that instead of 17 g of the polyacrylonitrile A and 83 g of N,N'-dimethylformamide, 12.5 g of a polyacrylonitrile C having a different molecular weight from those of the polyacrylonitrile A and the polyacrylonitrile B and 87.5 g of N,N'-dimethylformamide were used. The polyacrylonitrile C was so prepared as to allow a sulfonic acid group to be introduced into all ends of a polymer chain thereof.

Experimental Example 4

A display unit was fabricated by a procedure similar to that of Experimental Example 1, except that instead of 17 g of the polyacrylonitrile A and 83 g of N,N'-dimethylformamide, 7.5 g of a polyacrylonitrile D having a different molecular weight from those of the polyacrylonitrile A, the polyacrylonitrile B, and the polyacrylonitrile C and 92.5 g of N,N'-dimethylformamide were used. The polyacrylonitrile D was so prepared as to allow a sulfonic acid group to be introduced into all ends of a polymer chain thereof.

Experimental Example 5

A display unit was fabricated by a procedure similar to that of Experimental Example 1, except that instead of 17 g of the polyacrylonitrile A and 83 g of N,N'-dimethylformamide, 7.5 g of a polyacrylonitrile E having a molecular weight equal to that of the polyacrylonitrile D and 92.5 g of N,N'-dimethylformamide were used. The polyacrylonitrile E was so prepared without introducing a sulfonic acid group.

As performance of these display units of Experimental Examples 1 to 5, contrast (CR) and response time were determined. Results are illustrated in Table 1. It is to be noted that the molecular weights of the polyacrylonitriles A, B, C, D, and E had a relationship of polyacrylonitrile A<polyacrylonitrile B<polyacrylonitrile C<polyacrylonitrile D=polyacrylonitrile E, and the molecular weight of the polyacrylonitrile A was the smallest. As described above, the smaller the molecular weight of the polymer chain is, the more the mass concentration of the functional group (the sulfonic acid group) is increased; therefore, the mass concentrations of the sulfonic acid group in the acrylonitriles A, B, C, and D had a relationship of polyacrylonitrile A>polyacrylonitrile B>polyacrylonitrile C>polyacrylonitrile D. The molecular weight, the amount of the sulfonic acid group, and the like may be determined by, for example, chemical analysis technology such as IR (Infrared absorption spectrometry) measurement.

Contrast was calculated from white reflectivity (%) and black reflectivity (%) as contrast=white reflectivity (%)/black reflectivity (%). White reflectivity and black reflectivity were measured by applying an AC voltage (0.1 Hz and 15 V) to the display units for 1 hour, and then measuring reflectivity in a substrate normal direction with respect to a reference diffusion plate under 45°-0° ring illumination with use of a spectrophotometer (eye-one pro manufactured by X-Rite Inc.).

The response time was calculated from time necessary to change luminance under conditions that luminance when display in the bright state was performed was 1 and luminance when display in the dark state was performed was 0. More specifically, the response time refers to an average value of time necessary to change luminance from 0.1 to 0.9 while applying a rectangular-wave electric field (15 V) to the display unit and time necessary to change luminance from 0.9 to 0.1 after the application of the electric field was stopped. For measurement of the response time, a function generator (manufactured by Toyo Corporation) was used.

TABLE 1

| Experimental Example | Fibrous Structure Material | Surface Potential (mV) | Porosity (%) | White Reflectivity (%) | Black Reflectivity (%) | CR | Response Time (ms) |
| --- | --- | --- | --- | --- | --- | --- | --- |
| 1 | Polyacrylonitrile A | −65 | 80 | 46 | 1 | 46.0 | 400 |
| 2 | Polyacrylonitrile B | −54 | 85 | 43 | 1.1 | 39.1 | 400 |
| 3 | Polyacrylonitrile C | −46 | 90 | 40 | 1.3 | 30.8 | 400 |
| 4 | Polyacrylonitrile D | −38 | 95 | 38 | 1.5 | 25.3 | 400 |
| 5 | Polyacrylonitrile E | −25 | 95 | 35 | 2 | 17.5 | 600 |

As can be seen from Table 1, Experimental Examples 1 to 4 having the sulfonic acid group, the surface potential was lower, compared to Experimental Example 5 in which the sulfonic acid group did not exist. In other words, an absolute value of the surface potential was larger than 25 mV (Experimental Example 5). In such Experimental Examples 1 to 4, compared to Experimental Example 5, contrast and response speed were improved. In particular, in Experimental Examples 1 to 3, even though the porosity was lower than that in Experimental Example 5, response speed was increased by including the sulfonic acid group. Moreover, in Experimental Example 1 with a higher mass concentration of the sulfonic acid group of Experimental Examples 1 to 3, high contrast was obtained. It is confirmed from this result that the surface potential and ease of passage of the migrating particles in the porous layer are related to each other, and the lower the surface potential is, the more easily the migrating particles pass in the porous layer.

Although the present technology is described referring to the embodiment and the examples, the present technology is not limited thereto, and may be variously modified. For example, the electrophoresis device of the present technology may be applied to not only the display units but also other electronic apparatuses.

It is to be noted that the present technology is allowed to have following configurations.

(1) An electrophoresis device including:
in an insulating liquid,
migrating particles in a charged state; and
a porous layer including a fibrous structure and non-migrating particles, the fibrous structure having a potential opposite to that of the migrating particles, and the non-migrating particles held by the fibrous structure.

(2) The electrophoresis device according to (1), in which the fibrous structure is negatively charged, and the migrating particles are positively charged.

(3) The electrophoresis device according to (2), in which
the fibrous structure is made of polyacrylonitrile, and
an absolute value of a surface potential in the fibrous structure is larger than 25 mV.

(4) The electrophoresis device according to (2) or (3), in which the fibrous structure has a negatively charged functional group.

(5) The electrophoresis device according to any one of (1) to (4), in which the fibrous structure has a sulfonic acid group.

(6) The electrophoresis device according to any one of (1) to (5), in which a dispersant having positive and negative polarities is included in the insulating liquid.

(7) The electrophoresis device according to any one of (1) to (6), in which a fiber diameter of the fibrous structure is from 50 nm to 2000 nm both inclusive.

(8) The electrophoresis device according to any one of (1) to (7), in which an average pore diameter of the fibrous structure is from 0.1 μm to 10 μm both inclusive.

(9) The electrophoresis device according to any one of (1) to (8), in which the fibrous structure is formed by an electrostatic spinning method.

(10) The electrophoresis device according to any one of (1) to (9), in which the non-migrating particles and the migrating particles have reflection properties different from each other.

(11) The electrophoresis device according to (10), in which
reflectivity of the non-migrating particles is higher than reflectivity of the migrating particles, and
the migrating particles perform display in a dark state, and the porous layer performs display in a bright state.

(12) The electrophoresis device according to any one of (1) to (11), in which the non-migrating particles are made of one or more of an organic pigment, an inorganic pigment, a dye, a carbon material, a metal material, a metal oxide, glass, and a polymer material.

(13) A display unit provided with an electrophoresis device, the electrophoresis device including:
in an insulating liquid,
migrating particles in a charged state; and
a porous layer including a fibrous structure and non-migrating particles, the fibrous structure having a potential opposite to that of the migrating particles, and the non-migrating particles held by the fibrous structure.

(14) An electronic apparatus provided with a display unit including an electrophoresis device, the electrophoresis device including:
in an insulating liquid,
migrating particles in a charged state; and
a porous layer including a fibrous structure and non-migrating particles, the fibrous structure having a potential opposite to that of the migrating particles, and the non-migrating particles held by the fibrous structure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An electrophoresis device, comprising:
    in an insulating liquid:
        migrating particles in a charged state; and
        a porous layer that includes a fibrous structure and non-migrating particles,
        wherein the fibrous structure has a potential opposite to that of the migrating particles,
        wherein the non-migrating particles held by the fibrous structure have a potential same as the potential of the fibrous structure, and
        wherein the insulating liquid comprises a dispersant that has both a positive polarity and a negative polarity.

2. The electrophoresis device according to claim 1, wherein the fibrous structure is negatively charged, and the migrating particles are positively charged.

3. The electrophoresis device according to claim 2, wherein
    the fibrous structure comprises polyacrylonitrile, and
    an absolute value of a surface potential in the fibrous structure is larger than 25 mV.

4. The electrophoresis device according to claim 2, wherein the fibrous structure has a negatively charged functional group.

5. The electrophoresis device according to claim 1, wherein the fibrous structure has a sulfonic acid group.

6. The electrophoresis device according to claim 1, wherein a fiber diameter of the fibrous structure is from 50 nm to 2000 nm both inclusive.

7. The electrophoresis device according to claim 1, wherein an average pore diameter of the fibrous structure is from 0.1 μm to 10 μm both inclusive.

8. The electrophoresis device according to claim 1, wherein the fibrous structure is obtained by an electrostatic spinning method.

9. The electrophoresis device according to claim 1, wherein the non-migrating particles and the migrating particles have reflection properties different from each other.

10. The electrophoresis device according to claim 9, wherein
    reflectivity of the non-migrating particles is higher than reflectivity of the migrating particles, and
    the migrating particles are configured to display in a dark state, and the porous layer is configured to display in a bright state.

11. The electrophoresis device according to claim 1, wherein the non-migrating particles comprises at least one of an organic pigment, an inorganic pigment, a dye, a carbon material, a metal material, a metal oxide, glass, or a polymer material.

12. The electrophoresis device according to claim 1, wherein the fibrous structure has a phosphoric acid group.

13. The electrophoresis device according to claim 1, wherein the migrating particles are one of white colored or black colored.

14. A display unit, comprising:
    an electrophoresis device, comprising:
        in an insulating liquid:
        migrating particles in a charged state; and
        a porous layer that includes a fibrous structure and non-migrating particles,
        wherein the fibrous structure comprises a functional group that has a potential opposite to that of the migrating particles,
        wherein the non-migrating particles held by the fibrous structure have a potential same as the potential of the fibrous structure, and
        wherein the insulating liquid comprises a dispersant that has both a positive polarity and a negative polarity.

15. An electronic apparatus, comprising:
    an electrophoresis device, comprising:
        in an insulating liquid:
        migrating particles in a charged state; and
        a porous layer that includes a fibrous structure and non-migrating particles,
        wherein the fibrous structure comprises a functional group that has a potential opposite to that of the migrating particles,
        wherein the non-migrating particles held by the fibrous structure have a potential same as the potential of the fibrous structure, and
        wherein the insulating liquid comprises a dispersant that has both a positive polarity and a negative polarity.

* * * * *